United States Patent Office 2,861,999
Patented Nov. 25, 1958

2,861,999

PRODUCTION OF CYANOPYRIDINES

Alfred F. D'Alessandro, Havertown, Pa., assignor to Allied Chemical Corporation, a corporation of New York No Drawing. Application March 27, 1956
Serial No. 574,099

6 Claims. (Cl. 260—294.9)

This invention relates to a process for production of cyanopyridines by oxidizing alkyl substituted pyridines in the presence of ammonia. More particularly, this invention relates to a process for the production of improved yields of cyanopyridines by reacting alkyl substituted pyridines with ammonia and oxygen in the presence of fluidized oxidation catalysts containing metal oxides supported on activated alumina. This process is an improvement on the process described in U. S. P. 2,510,605 which issued June 6, 1950 to Frank Porter et al.

I have discovered that under certain limited correlated conditions of operation hereinafter set forth, improved yields of cyanopyridines may be obtained. I have made the further discovery that such improved yields of cyanopyridines may be produced in accordance with the present invention with relatively low ammonia requirements.

Accordingly, an object of the present invention is to provide a process for production of improved yields of cyanopyridines.

Another object of the invention is to provide a process for the production of improved yields of cyanopyridines from alkyl substituted pyridines, oxygen and ammonia in the presence of fluidized alumina-supported oxidation catalysts.

Further objects and advantages of the present invention will be apparent to those skilled in the art from the following description and examples.

In accordance with the present invention, a cyanopyridine product may be obtained in improved yield by mixing an alkyl substituted pyridine with air or other oxygen-containing gas and ammonia and then passing the gaseous mixture upwardly through an oxidation catalyst having a particle size of about 50 to 3000 microns and containing a metal oxide supported on activated alumina, at a linear velocity of about 0.02 to 10 feet per second to effect fluidization of the catalyst, and maintaining said gaseous mixture in contact with the catalyst at a temperature of about 250° to 450° C. for a period of at least about 0.1 second.

The alkyl substituted pyridines suitable for conversion into cyanopyridines by the process of this invention include alkyl or polyalkyl substituted pyridines. Typical examples of the substituted pyridines are the 2-, 3- and 4- picolines; the 2,3-, 2,4-, 2,5-, 2,6-, and 3,4- dimethyl pyridines; the 2,3,4-, 2,4,6-, 2,3,6- and 2,3,5- trimethyl pyridines; the 2-, 3-, and 4- ethyl pyridines; 2-methyl, 5-ethyl pyridine; and 2-ethyl, 5-methyl pyridine. The alkyl or polyalkyl substituted pyridines of the present invention may either be synthetically prepared or may comprise natural fractions obtained from coal tar.

According to a preferred embodiment of the present invention, the improved yields of cyanopyridines are produced by carrying out the aforementioned procedure while employing a mol ratio of ammonia to alkyl substituted pyridine reactant of about 2 to 5:1. A representative set of conditions for this aspect of the invention is as follows: passing a gaseous reaction mixture containing about 2 to 5 mols of ammonia and about 5 to 50 mols of oxygen for every mol of alkyl substituted pyridine reactant upwardly through an oxidation catalyst having a particle size of about 50 to 3000 microns and containing one or more metal oxides supported on activated alumina, at a linear velocity of about 0.02 to 10 feet per second to effect fluidization of the catalyst, and maintaining said gaseous mixture at a temperature of about 310° to 365° C. in contact with the catalyst for a period of about 0.1 to 10 seconds.

By means of the correlated operating conditions of the present invention, several advantages are obtained. First of all, improved yields of cyanopyridines over those obtained by prior art procedures are obtained. Further, the present procedure is applicable to alkyl substituted pyridines which contain alkyl substituents in more than one of the 2, 4 and 6 positions, and particularly to such compounds when all alkyl substituents contain one or two carbon atoms. When, as is preferred, relatively low amounts of ammonia are employed with the alkyl substituted pyridine charge, excellent yields of cyanopyridines are obtained while relatively expensive recovery of large quantities of ammonia is avoided and requirements for quantity of catalyst and reactor size are reduced per unit of throughput of alkyl substituted pyridine charge.

Generally speaking, the reaction mixture should contain at least about 2 mols of ammonia for each mol of alkyl substituted pyridine reactant. However, it is one of the unexpected characteristics of the present invention that the improved yields of cyanopyridines are realized upon use with the alkyl substituted pyridine charge of relatively low quantities of ammonia. Contrary to expectation, very efficient utilization of the starting material and ammonia may be obtained in the fluidized catalyst bed so that the mol ratio of ammonia to starting material employed may be in the order of about 2 to 5:1. When using these quantities of ammonia in the present reaction, about 1.5 to 3.5 mols of the ammonia per mol of alkyl substituted pyridine are consumed. Thus, this preferred embodiment of the present invention results in simplicity of the process by enabling use of a smaller reactor and avoiding expensive recovery of large amounts of unreacted ammonia.

However, in its broader aspects, this invention contemplates the utilization of ammonia in greater amounts, as up to 15 mols of ammonia per mol of alkyl substituted pyridine.

In place of ammonia a primary alkyl amine may be used to form the cyanopyridines of this invention. When a primary alkyl amine is employed instead of ammonia, the same molecular proportions of amine to alkyl substituted pyridine reactant are used as described above for ammonia.

The oxidizing agent used in the present invention is oxygen. Although air is the preferred oxidizing agent, the feed mixture can also be made up with oxygen, oxygen-enriched air or air or oxygen diluted with nitrogen, carbon dioxide, steam or other inert gases. Generally speaking, suitable mol ratios of oxygen to alkyl substituted pyridine reactant are at least about 5:1 and preferably range from about 5 to 50:1.

The catalysts employed in carrying out the process of this invention are oxidation catalysts comprising activated alumina-supported metal oxides which permit the partial oxidation of organic compounds. Preferably, the activated alumina-supported catalysts used are those which permit dehydrogenation of hydrocarbons and their oxidation to oxygen-containing partial oxidation products. Typical among the suitable catalysts are activated alumina-supported oxides of vanadium, molybdenum, columbium, uranium and manganese. The metal oxides can be used alone or mixed with each other. Particularly efficient catalysts are activated alumina-supported catalysts containing oxides of vanadium, molybdenum and phosphorus. Generally speaking, for the sake of efficiency, the catalyst should contain at least about 5% by weight of the catalytically active metal oxides. The catalysts are utilized in finely divided form in the present invention and generally have a catalyst size ranging from about 50 to 3000 microns (about 270 to 6 mesh).

I have found that by use of a fluidized catalyst bed maximum yields and efficiency of the process are realized. The catalyst may be maintained in fluidized form by passing the gaseous reaction mixture upwardly through the catalyst bed at linear velocities of about 0.02 to 10 feet per second while maintaining suitable catalyst bed depth of say 1 to 72 inches to maintain the desired space velocity. As the linear velocity is increased, it may be found necessary to use a larger catalyst size in order to prevent excessive entrainment of the catalyst. Suitable space velocities range from about 100 to 10,000 cc. of reaction gas (calculated at S. T. P.) per hour per cc. apparent volume of catalyst.

The reaction temperatures, generally speaking, range from about 250° to 450° C., with optimum results being obtained between about 310° and 365° C. I have found that the optimum temperature range is somewhat dependent upon the particular catalyst and starting material used and may be determined by simple experimentation. For example, when employing a naturally occurring starting material and a catalyst comprising activated alumina-supported vanadium oxide, the optimum temperatures range from about 325° to 365° C. However, when employing synthetic material and activated alumina-supported vanadium oxide catalyst, the optimum temperatures range from about 310° to 330° C.

The contact time defined as the ratio of the catalyst volume to the flow rate of gas (at reaction conditions) is at least about 0.1 second and generally is within the range of about 0.1 to 10 seconds.

The cyanopyridines produced by the process of this invention may be recovered by any suitable procedure such as by passing the gaseous products successively through water cooled condensers, dry ice traps and glass wool filters. The products may be washed out of the collecting traps with a suitable inert solvent such as benzene. The resulting two-phase water-benzene mixture may then be distilled until the water is azeotroped off. Residual benzene may then be distilled off almost completely. Finally, the residue may be distilled at reduced pressure, e. g. about 65 mm. of mercury, to separate unreacted picolines and the desired cyanopyridines.

The initial cyanopyridine product formed by the process of this invention usually has a purity of at least about 90%. If desired or required, the initial product may be further purified by simple sublimation or distillation procedures to produce a final cyanopyridine product which is, for all intents and purposes, entirely pure.

The cyanopyridines produced by the process of this invention have substantial commercial use as raw materials or intermediates in the production of various pharmaceuticals, plastics, resins and surface active agents.

My invention will be further illustrated by the following examples:

*Example 1.*—A gaseous mixture of a synthetic 3-picoline rich material (containing 73 mol percent 3-picoline and 27 mol percent 4-picoline), ammonia and air, in the proportions of one mol of the 3-picoline material, 11.8 mols of ammonia and 147 mols of air, was passed upwardly through a fluidized bed about 3 inches deep of a finely divided catalyst comprising oxides of vanadium, molybdenum and phosphorus supported on activated alumina at a temperature of 317° C. and at a space velocity of 2240 per hour (calculated at S. T. P.), which corresponded to a contact time of 0.6 second. Velocity of the gases passing through the finely divided solid was 0.14 foot per second (calculated at S. T. P.).

The catalyst had a particle size of 149 to 210 microns and was prepared as follows: a hydrochloric acid solution of ammonium metavanadate, molybdic anhydride and phosphoric acid on through 50 mesh gamma-alumina was evaporated and then roasted at about 400° C. The catalyst was screened to separate the desired particles. The composition of the finished catalyst was 38.9, 12.4 and 0.14 weight percent of vanadia, molybdena and phosphorus pentoxide, respectively.

The nicotinonitrile product was taken up with benzene, and water was azeotroped off. Following distillation of the remaining benzene and unreacted picolines, nicotinonitriles were distilled over at a reduced pressure and were recovered at a yield of 83% based on the picoline fed.

*Example 2.*—The process of Example 1 was carried out except using 3.5 mols of ammonia and 160 mols of air for every mol of 3-picoline; at a temperature of 315° C.; at a space velocity of 3030 per hour (calculated at S. T. P.), which corresponds to a contact time of 0.4 second; and at a linear velocity of 0.14 foot per second (calculated at S. T. P.). The resulting mol percent yield of nicotinonitriles based on the picoline fed was 74.9%. In this run only 2.8 mols of ammonia per mol of picoline were consumed.

*Example 3.*—The process of Example 1 was followed with synthetic 4-picoline (containing 92–95 mol percent 4-picoline, about 2 mol percent 2,5-dimethyl pyridine and minor amounts of pyridine and aromatics) as the starting material. Ammonia and air were employed in the proportions of 13.6 mols of ammonia and 181 mols of air per mol of starting material, and the reaction temperature was 311° C. The yield of nitriles based on the picoline fed was 87.7 mol percent.

*Example 4.*—The process of Example 3 was followed except that ammonia and air were employed in the proportions of 7.3 mols of ammonia and 109 mols of air per mol of starting material; the space velocity was 2520 per hour (calculated at S. T. P.), which corresponded to a contact time of 0.5 second; the linear velocity was 0.15 foot per second (calculated at reaction conditions); and the reaction temperature was 316° C. The yield of nitriles based on the picoline fed was 87.2 mol percent.

*Example 5.*—A 2,6-dimethyl pyridine sample (containing 81% of 2,6-dimethyl pyridine) was mixed with ammonia and air, in the proportions of 13.1 mols of ammonia and 174 mols of air per mol of 2,6-dimethyl pyridine, and was then passed upwardly through a fluidized bed about 3 inches deep of a finely divided catalyst comprising oxides of vanadium, molybdenum and phosphorus supported on activated alumina at a temperature of 326° C. and at a space velocity of 2240 per hour (calculated at S. T. P.), which corresponded to a contact time of 0.6 second. Velocity of the gases passing through the finely divided catalyst was 0.14 foot per second (calculated at S. T. P.).

The catalyst had a particle size averaging between 105 and 210 microns and was prepared as follows: a hydrochloric acid solution of ammonium metavanadate, molybdic anhydride and phosphoric acid on through 50 mesh gammaalumina was evaporated and then roasted at 400° C. The catalyst was screened to separate the desired particles. The composition of the finished catalyst was 38.9, 12.4 and 0.14 weight percent of vanadia, molybdena and phosphorus pentoxide, respectively.

The resulting product was taken up with benzene and then distilled to azeotropically remove water. The remaining benzene and unreacted 2,6-dimethyl pyridine were then removed by distillation. The residue comprised 6-methyl-picolinonitrile which distilled over at 155° C. under a pressure of 80 mm. of mercury at a yield of 49.5 mol percent based on the 2,6-dimethyl pyridine fed.

*Example 6.*—In this example a 2,6-dimethyl pyridine sample (containing 81% of 2,6-dimethyl pyridine) was reacted with ammonia and air in accordance with the procedure of Example 5 except that 7.4 mols of ammonia and 99 mols of air per mol of 2,6-dimethyl pyridine, and a reaction temperature of 319° C. were employed. The yield of 6-methyl-picolinonitrile based on the 2,6-dimethyl pyridine fed was 42.0 mol percent.

*Example 7.*—In this example, the starting material was a natural 3- and 4-picoline mixture containing the following ingredients:

| | Weight percent |
|---|---|
| 3-picoline | 33.8 |
| 4-picoline | 35.7 |
| 2,6-dimethyl pyridine | 27.4 |
| 2,5-dimethyl pyridine | 0.6 |
| 2-ethyl pyridine | 0.8 |
| 2-picoline | 1.7 |

The procedure of Example 5 was followed except that the proportions of reactants were 13.0 mols of ammonia and 107 mols of air per mol of picoline, and the reaction temperature was 345° C. The cyanopyridine product was recovered in a yield of 59.9 mol percent based on the picoline fed. This product was admixed with products obtained in other runs under conditions similar to those given above. According to fractionation and chemical tests, the composite product had the following composition:

| | Weight percent |
|---|---|
| Isonicotinonitrile | 51 |
| Nicotinonitrile | 31 |
| 6-methyl-picolinonitrile | 11 |
| Picolinonitrile | 7 |

*Example 8.*—The process of example 7 was followed except that the natural 3- and 4-picoline mixture, ammonia and air were employed in the proportions of 7.1 mols of ammonia and 92 mols of air per mol of alkyl pyridine; the space velocity was 2210 per hour, which corresponded to a contact time of 0.5 second; the linear velocity was 0.13 foot per second (calculated at S. T. P); and the reaction temperature was 347° C. The resulting mol percent yield of cyanopyridine product was 58.7 mol percent based on the picoline fed.

*Example 9.*—A gaseous mixture of a synthetic 3-picoline rich material (containing 73 mol percent 3-picoline and 27 mol percent 4-picoline), ammonia and air, in the proportions of 7.3 mols of ammonia and 168 mols of air per mol of picoline material, was passed upwardly through a fluidized bed about 2.3 inches deep of a finely divided catalyst comprising vanadium pentoxide containing alundum and dissolved alumina at a temperature of 378° C. and at a space velocity of 1835 per hour (calculated at S. T. P.), which corresponded to a contact time of 0.6 second. Velocity of the gases passing through the finely divided solid was 0.08 foot per second (calculated at S. T. P.).

The catalyst had a particle size of 149–210 microns and was obtained by fusing vanadium pentoxide in a mixture with alundum, and grinding and screening the cooled melt.

The nicotinonitrile product was taken up with benzene, and water was azeotroped off. Following distillation of the remaining benzene and unreacted picolines, nicotinonitriles were recovered at a yield of 38.3 mol percent based on the picoline fed.

*Example 10.*—A gaseous mixture of the starting material of Example 9, ammonia and air, in the proportions of 6.3 mols of ammonia and 155 mols of air per mol of picoline material, was passed upwardly through an expanded fluidized bed about 4.3 inches deep of a finely divided catalyst comprising the oxides of vanadium, molybdenum and phosphorus at a temperature of 413° C. and at a space velocity of 2170 per hour (calculated at S. T. P.), which corresponded to a contact time of 0.5 second. Velocity of the gases passing through the finely divided solid was 0.2 foot per second (calculated at S. T. P.).

The catalyst had a particle size of 105 to 210 microns and was prepared as follows: vanadium pentoxide, molybdic anhydride and ammonium monohydrogen orthophosphate were fused together to form a mixture of vanadia, molybdena and phosphorus pentoxide in the same proportions as in the catalyst of Example 5, but without a support. The fused mixture was ground and screened to separate the desired particle size range.

The nicotinonitrile product was recovered in accordance with the procedure of Example 9 and comprised a yield of 20.0 mol percent based on the picoline fed.

*Example 11.*—A gaseous mixture of a natural 3- and 4-picoline mixture, ammonia and air, in the proportions of 7.0 mols of ammonia, 92.5 mols of air and 0.47 mol of picolines, was passed upwardly through a fluidized bed about 2.8 inches deep of a finely divided catalyst comprising the oxides of vanadium, molybdenum and phosphorus supported on alundum at a temperature of 317° C. and at a space velocity of 2420 per hour (calculated at S. T. P.), which corresponded to a contact time of 0.52 second. Velocity of the gases passing through the finely divided solid was 0.14 foot per second (calculated at S. T. P.).

The catalyst had a particle size of 105 to 210 microns and was prepared as follows: a hydrochloric acid solution of ammonium metavanadate, molybdic anhydride and phosphoric acid on alundum, ground and screened to proper size, was evaporated and then roasted at 400° C. The catalyst was rescreened to separate the desired particles. The composition of the finished catalyst was 20.0, 6.4 and 0.8 weight percent of vanadia, molybdena and phosphorus pentoxide, respectively.

The product was taken up with benzene, and water was then azeotroped off. Following distillation of the remaining benzene and unreacted picolines, cyanopyridine product was recovered in a yield of only 8.2 mol percent based on the picoline fed.

Above Examples 9 to 11 indicate clearly that in the absence of an activated alumina support the outstanding results of the present invention are not obtained.

Fluidized beds of activated alumina-supported oxidation catalysts, such as those which contain vanadium oxide, molybdenum oxide, mixtures of these oxides, or mixtures of one or more of these oxides with phosphorus pentoxide, may be substituted for the catalysts used in the above examples to obtain improved yields of cyanopyridines.

While I have described the preferred embodiments for carrying out the process of my invention, it will be apparent that many changes may be made without departing from the spirit of the invention.

I claim:

1. A process for the production of cyanopyridines which comprises passing a gaseous mixture comprising a member of the group consisting of monoalkyl and dialkyl substituted pyridines, ammonia and oxygen, in the proportions of about 2 to 5 mols of ammonia and about 5 to 50 mols of oxygen per mol of alkyl substituted pyridine, upwardly through an oxidation catalyst having a particle size of about 50 to 3000 microns and containing oxides of vanadium, molybdenum and phosphorus supported on activated alumina, at a linear velocity of about 0.02 to 10 feet per second to effect fluidization of the catalyst, and maintaining said gaseous mixture in contact with the catalyst at a temperature of about 310° to 365° C. for a period of about 0.1 to 10 seconds.

2. A process for the production of cyanopyridines which comprises passing a gaseous mixture comprising 3-picoline, ammonia and oxygen, in the proportions of about 2 to 5 mols of ammonia and about 5 to 50 mols of oxygen per mol of 3-picoline, upwardly through an oxidation catalyst having a particle size of about 50 to 3000 microns and containing oxides of vanadium, molybdenum and phosphorus supported on activated alumina, at a linear velocity of about 0.02 to 10 feet per second to effect fluidization of the catalyst, and maintaining said gaseous mixture in contact with the catalyst at a temperature of about 310° to 365° C. for a period of about 0.1 to 10 seconds.

3. A process for the production of cyanopyridines which comprises passing a gaseous mixture comprising 4-picoline, ammonia and oxygen, in the proportions of about 2 to 5 mols of ammonia and about 5 to 50 mols of oxygen per mol of 4-picoline, upwardly through an oxidation catalyst having a particle size of about 50 to 3000 microns and containing oxides of vanadium, molybdenum and phosphorus supported on activated alumina, at a linear velocity of about 0.02 to 10 feet per second to effect fluidization of the catalyst, and maintaining said gaseous mixture in contact with the catalyst at a temperature of about 310° to 365° C. for a period of about 0.1 to 10 seconds.

4. A process for the production of cyanopyridines which comprises passing a gaseous mixture comprising 3-picoline, 4-picoline, ammonia and oxygen, in the proportions of about 2 to 5 mols of ammonia and about 5 to 50 mols of oxygen per mol of picolines, upwardly through an oxidation catalyst having a particle size of about 50 to 3000 microns and containing oxides of vanadium, molybdenum and phosphorus supported on activated alumina, at a linear velocity of about 0.02 to 10 feet per second to effect fluidization of the catalyst, and maintaining said gaseous mixture in contact with the catalyst at a temperature of about 310° to 365° C. for a period of about 0.1 to 10 seconds.

5. A process for the production of cyanopyridines which comprises passing a gaseous mixture comprising 2,6-dimethyl pyridine, ammonia and oxygen, in the proportions of about 2 to 5 mols of ammonia and about 5 to 50 mols of oxygen per mol of 2,6-dimethyl pyridine, upwardly through an oxidation catalyst having a particle size of about 50 to 3000 microns and containing oxides of vanadium, molybdenum and phosphorus supported on activated alumina, at a linear velocity of about 0.02 to 10 feet per second to effect fluidization of the catalyst, and maintaining said gaseous mixture in contact with the catalyst at a temperature of about 310° to 365° C. for a period of about 0.1 to 10 seconds.

6. A process for the production of cyanopyridines which comprises passing a gaseous mixture comprising a monoalkyl substituted pyridine, ammonia and oxygen, in the proportions of about 2 to 5 mols of ammonia and about 5 to 50 mols of oxygen per mol of alkyl substituted pyridine, upwardly through an oxidation catalyst having a particle size of about 50 to 3000 microns and containing oxides of vanadium, molybdenum and phosphorus supported on activated alumina, at a linear velocity of about 0.02 to 10 feet per second to effect fluidization of the catalyst, and maintaining said gaseous mixture in contact with the catalyst at a temperature of about 310° to 365° C. for a period of about 0.1 to 10 seconds.

References Cited in the file of this patent

UNITED STATES PATENTS

| | | |
|---|---|---|
| 2,510,605 | Porter | June 6, 1950 |
| 2,789,980 | Scudi et al. | Apr. 23, 1957 |

FOREIGN PATENTS

| | | |
|---|---|---|
| 671,763 | Great Britain | May 7, 1952 |